US007025171B2

(12) United States Patent
Cox

(10) Patent No.: US 7,025,171 B2

(45) Date of Patent: Apr. 11, 2006

(54) SAFETY HARNESS

(75) Inventor: Ronald J. Cox, Cranberry Township, Butler County, PA (US)

(73) Assignee: Bacou-Dalloz Fall Protection, Inc., Franklin, PA (US)

( * ) Notice: Subject to any disclaimer, the term of this patent is extended or adjusted under 35 U.S.C. 154(b) by 0 days.

(21) Appl. No.: 10/167,221

(22) Filed: Jun. 10, 2002

(65) Prior Publication Data

US 2003/0101946 A1 Jun. 5, 2003

Related U.S. Application Data

(63) Continuation of application No. 09/215,479, filed on Dec. 18, 1998, now Pat. No. 6,405,685, which is a continuation of application No. 09/059,239, filed on Apr. 13, 1998, now abandoned, which is a continuation of application No. 08/718,931, filed on Sep. 24, 1996, now Pat. No. 6,006,700.

(51) Int. Cl.

| | |
|---|---|
| ***A47L 3/04*** | (2006.01) |
| ***A62B 35/00*** | (2006.01) |
| ***B64D 17/30*** | (2006.01) |

(52) U.S. Cl. ....................... 182/3; 244/151 R; 119/857

(58) Field of Classification Search .................... 182/3, 182/4, 191, 5, 193, 6, 7, 9; 104/115; 244/151 R; 224/255, 257, 259; 297/464, 465, 466, 467; 119/857, 712, 856; 54/134

See application file for complete search history.

(56) References Cited

U.S. PATENT DOCUMENTS

| | | | |
|---|---|---|---|
| 2,647,293 | A | 8/1953 | Wintercorn |
| 2,979,028 | A | 4/1961 | Zakely |
| 2,979,153 | A | 4/1961 | Hoagland |
| 3,322,163 | A | 5/1967 | Hughes |
| 3,424,134 | A | 1/1969 | Rosenblum |
| 3,568,726 | A | 3/1971 | Thompson |
| 3,662,787 | A | 5/1972 | Schiappa |
| 3,757,744 | A | 9/1973 | Pravaz |
| 3,807,798 | A | 4/1974 | Mattson |

(Continued)

FOREIGN PATENT DOCUMENTS

| | | |
|---|---|---|
| AU | 123515 | 7/1945 |

(Continued)

OTHER PUBLICATIONS

Photographs (two) of Recreational Harness available from Rock Solid Manufacturing of Canada, no month and date available.

Photographs (four) of Harness Model 659N available from Bashin Industries, Inc. of Grove City, Pennsylvania.

*Primary Examiner*—Hugh B. Thompson II

(74) *Attorney, Agent, or Firm*—Bartony & Hare, LLP

(57) ABSTRACT

A safety harness comprises a strap portion for extending over a portion a the person's body to retain the person within the safety harness. The strap portion is fabricated from a flexible material having an elastic extension in the range of approximately 3 to approximately 15% under a tensile load of approximately 10 pounds. The material of the strap portion also preferably has ultimate tensile load of at least approximately 5,000 lbs. A safety harness to be worn by a person to protect the person at a height, at least a section of a shoulder strap of the safety harness comprises a single strap having elastic extension to enable free movement of a person in the safety harness, the elastic extension of the strap being limited to prevent separation of a person from the safety harness.

3 Claims, 6 Drawing Sheets

U.S. PATENT DOCUMENTS

| | | | | |
|---|---|---|---|---|
| 3,872,895 | A * | 3/1975 | Takada | 139/415 X |
| 3,897,106 | A | 7/1975 | Takada | |
| 4,273,216 | A * | 6/1981 | Weissmann | 182/3 |
| 4,479,267 | A | 10/1984 | Radowsky, Jr. | |
| 4,512,437 | A | 4/1985 | Savage | |
| 4,553,633 | A | 11/1985 | Armstrong | |
| 4,625,335 | A | 12/1986 | Vinai | |
| 4,632,217 | A | 12/1986 | Markwell | |
| 4,662,487 | A | 5/1987 | Koch | |
| 4,710,123 | A | 12/1987 | Imamura | |
| 4,712,513 | A | 12/1987 | Huppertsberg | |
| 4,854,418 | A | 8/1989 | Hengstenberg | |
| 4,958,853 | A * | 9/1990 | Doty | 297/472 X |
| 4,991,689 | A | 2/1991 | Cole | |
| 5,036,949 | A | 8/1991 | Crocker | |
| 5,050,704 | A * | 9/1991 | Olsson | 182/9 |
| 5,203,829 | A | 4/1993 | Fisk | |
| 5,220,976 | A | 6/1993 | Gunter | |
| 5,329,884 | A | 7/1994 | Bell | |
| 5,433,289 | A | 7/1995 | O'Rourke | |
| 5,487,444 | A | 1/1996 | Dennington | |
| 5,522,404 | A | 6/1996 | Williams | |
| 5,531,292 | A | 7/1996 | Bell | |
| 5,615,750 | A * | 4/1997 | Phillips | 182/6 |
| 5,632,526 | A | 5/1997 | McLarty, III | |
| 6,006,860 | A * | 12/1999 | Bell | 182/3 X |

FOREIGN PATENT DOCUMENTS

| | | | |
|---|---|---|---|
| CA | 859487 | | 12/1970 |
| CA | 2135504 | | 5/1995 |
| DE | 25 29 559 | | 1/1977 |
| DE | 27 06 284 | | 8/1978 |
| DE | 3604973 | A1 | 8/1987 |
| EP | 0 046 911 | A1 | 3/1982 |
| FR | 2 288 532 | | 6/1976 |
| FR | 2 565 112 | | 6/1985 |
| FR | 2 557 801 | | 7/1985 |
| FR | 2 606 650 | | 5/1988 |
| GB | 826786 | | 1/1960 |
| GB | 1113030 | | 5/1968 |
| GB | 1 506 926 | | 4/1978 |
| GB | 2 310 586 | | 9/1997 |
| NL | 7413214 | | 1/1975 |
| RU | 967488 | | 10/1982 |
| WO | WO 89/10160 | | 11/1989 |
| WO | WO 95/16498 | | 6/1995 |
| WO | WO 98/13104 | | 4/1998 |

* cited by examiner

SAFETY HARNESS

CROSS-REFERENCE TO RELATED U.S. APPLICATIONS

This is a continuation of patent application Ser. No. 09/215,479, filed Dec. 18, 1998, now U.S. Pat. No. 6,405,685, which is a continuation of patent application Ser. No. 09/059,239, filed Apr. 13, 1998, now abandoned, which is a continuation of patent application Ser. No. 08/718,931, filed Sep. 24, 1996, now U.S. Pat. No. 6,006,700, the disclosures of which are incorporated herein by reference.

FIELD OF THE INVENTION

The present invention relates to a safety device and, more particularly, to a safety harness to be worn by a person to protect that person from injury in case of a fall.

BACKGROUND OF THE INVENTION

Safety harnesses are commonly used as part of a fall protection system for persons subjected to the potential of a fall from a height. In the workplace, full-body safety harnesses are generally used. Such harnesses, which typically include shoulder straps, can be designed in many alternative manners. See, for example, U.S. Pat. Nos. 5,531,292, 5,329,884, and 5,203,829.

Currently available full-body safety harnesses are generally manufactured from flexible, but relatively inelastic, woven materials such as nylon and polyester. Such materials are generally capable of an elastic extension of approximately 1% or less under a tensile load of approximately 10 pounds. Indeed, even at a tensile load of approximately 100 pounds, such materials generally exhibit an elastic extension of approximately 2.5% or less. Although the strength of such materials is suitable for fall protection, harnesses fabricated from such materials impair movement of a worker while in the harness. This impairment of movement often results in discomfort, reduced effectiveness and quick fatigue of the worker. The limited range of motion, discomfort and fatigue associated with current safety harnesses can result in safety lapses by the worker. Various attempts at redesigning safety harnesses to provide greater comfort and range of motion have met with very limited success.

It is, therefore, very desirable to develop safety harnesses that do not suffer from such drawbacks.

SUMMARY OF THE INVENTION

In general, the present invention provides a safety harness to be worn by a person. The safety harness comprises a strap portion for extending over a portion of the person's body to retain the person within the safety harness. At least a portion or section of the strap portion exhibits an elastic extension of at least 3% under a tensile load of approximately 20 pounds, and, more preferably, at a tensile load of approximately 10 pounds, thereby facilitating movement of the person within the safety harness. Preferably, at least a portion of the strap portion is adapted to exhibit an elastic extension in the range of approximately 3% to approximately 20% under a tensile load of approximately 20 pounds, and, more preferably, under a tensile load of approximately 10 pounds. More preferably, the elastic extension is in the range of approximately 3% to approximately 15% under such tensile loading. Most preferably, the elastic extension is in the range of approximately 7% to approximately 11% under such tensile loading. Preferably, substantially the entire strap portion or the entire strap portion is fabricated from a material exhibiting an elastic extension within the above ranges.

As used herein, percent elastic extension under a particular tensile loading is calculated using the following formula:

$$(\text{Length}_{(extended)} - \text{Length}_{(initial)})/\text{Length}_{(initial)} * 100\%$$

Over the range of elastic extension, the elastic materials used in the strap portions of the present invention preferably return to substantially their original (non-extended) length from an extension within the range of elastic extension when a tensile load is removed.

As used herein, the term "non-elastic" refers generally to materials having an elastic extension of less than approximately 3% under a tensile load of approximately 10 pounds.

The present inventors have discovered that use of material(s) capable of elastic extension of at least approximately 3% at a tensile load of approximately 10 to 20 pounds in one or more of the support strap portions of a safety harness greatly reduces, if not eliminates, the problems of limited motion and associated fatigue experienced with currently available safety harnesses. Additionally, incorporation of such elastic materials into one or more support strap portions of the present invention assists in creating a snug fit without restricting movement. Unlike currently available safety harnesses, there is substantially no need for frequent readjustment of the fit of the safety harnesses of the present invention. Moreover, the snug fit of the safety harnesses of the present invention substantially prevents sections of the strap portion from hanging away from the user's body, thereby reducing the risk that such hanging strap portion may snag some object or machinery in the work area.

In general, an extension (whether elastic or not) of a strap portion of greater than approximately 20% is undesirable, because of the increased risk that the user may come out of the harness. Such relatively large extensions are preferably avoided under normal working conditions and in fall arresting situations when tensile loads on support straps can be relatively large. Preferably, therefore, the elastic support straps of the present invention do not experience an elastic extension of greater than 20% under such conditions. The support strap(s) of the present invention preferably do not experience extension of greater than approximately 20% even under tensile loads up to approximately 100 pounds and, more preferably, at tensile load up to approximately 1,000 pounds.

In addition to exhibiting the above elastic characteristics, the elastic strap portion(s) of the present invention must be capable of withstanding the tensile forces experienced in common use and in arresting falls. Preferably, the elastic strap portion(s) of the present invention have a minimum ultimate tensile load of approximately 5,000 pounds. An ultimate tensile load of 5,000 pounds is a common industry standard.

In one embodiment, the present invention provides a full-body safety harness comprising an upper torso portion having a shoulder strap portion for extending over a respective shoulder of the person. As described above, at least a section of the shoulder strap exhibits an elastic extension of at least 3% at a tensile load of approximately 20 pounds and, more preferably, at a tensile load of approximately 10 pounds. Preferably, at least a section of the shoulder strap portion is adapted to have an elastic extension in the range of approximately 3 to approximately 20% under a tensile load of approximately 20 pounds and, more preferably, under a tensile load of approximately 10 pounds.

DETAILED DESCRIPTION OF THE INVENTION

Figure 1:
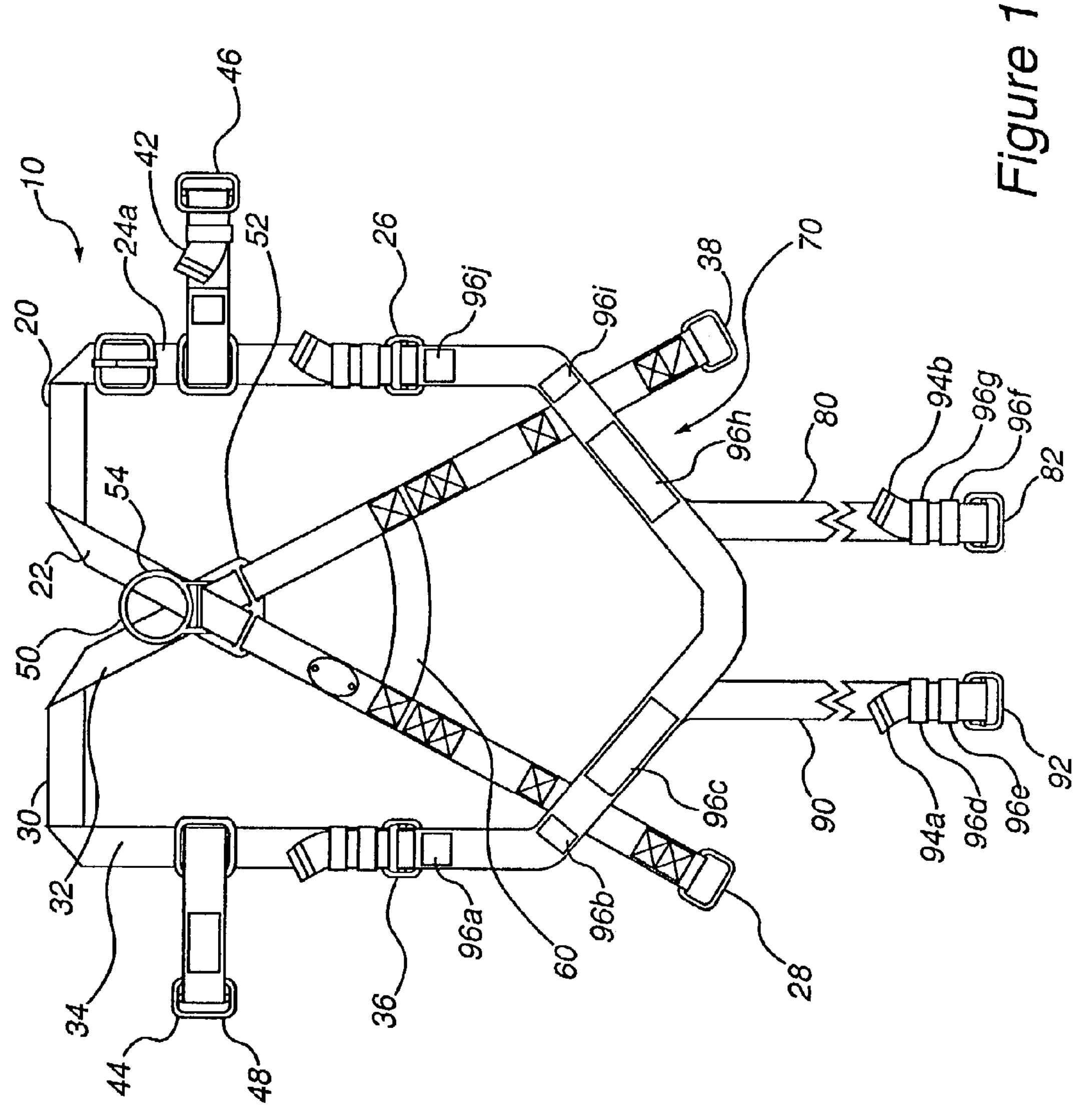
FIG. 1 illustrates a rear view of an embodiment of a full-body harness under the present invention.

Referring to FIG. 1, an embodiment of a full-body safety harness 10 under the present invention is discussed below. The overall structural design of FIG. 1 corresponds substantially to the Model 650 safety harness available from Miller Equipment of Franklin, Pa. Safety harness 10 comprises an upper torso portion comprising first and second shoulder straps 20 and 30 for extending over a respective shoulder of the user and a chest strap 40 (see FIG. 2) for extending over a portion of the chest of the user.

Figure 3:
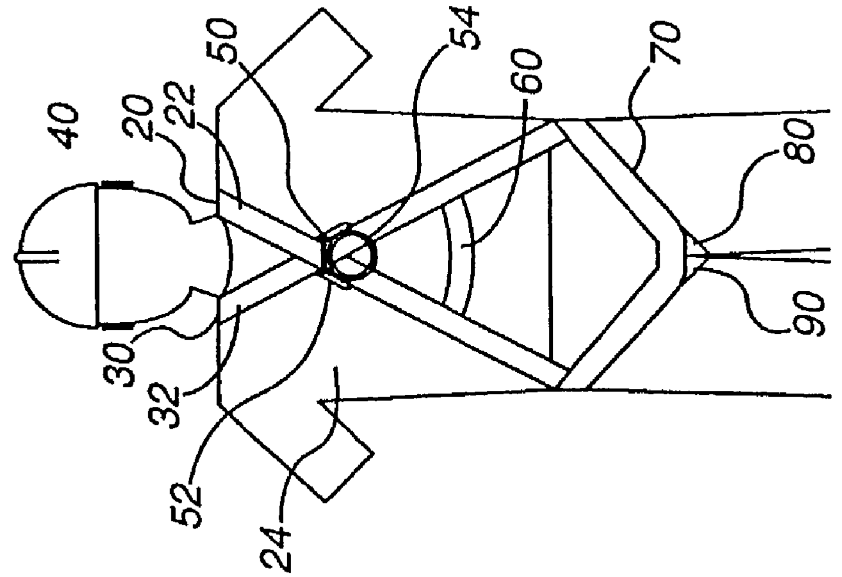
FIG. 3 illustrates a rear view of a person wearing the safety harness of FIG. 1.

As illustrated in FIG. 3 a first end of each of shoulder straps 20 and 30 extends down over the back of the user to form first and second generally longitudinal back straps 22 and 32, respectively. Longitudinal back straps 22 and 32 of shoulder straps 20 and 30 cross through and connect to a typical D-ring 50 as known in the art. D-ring 50 comprises a harness connection portion 52 and an anchor portion 54. Harness connection portion 52 enables fastening of D-ring 50 to safety harness 10 via longitudinal back straps 22 and 32. Anchor portion 54 is adapted to be connected to a nylon rope, a chain, webbing or other connector which may be used to anchor the person wearing safety harness 10.

In the embodiment of FIG. 1, after crossing and passing through D-ring 50, shoulder straps 20 and 30 are connected via a generally latitudinal back strap 60. As illustrated in FIG. 3, latitudinal back strap 60 passes generally latitudinally over a portion of the back of the user and is preferably fabricated from a relatively non-elastic material such as nylon and/or polyester.

Figure 2:
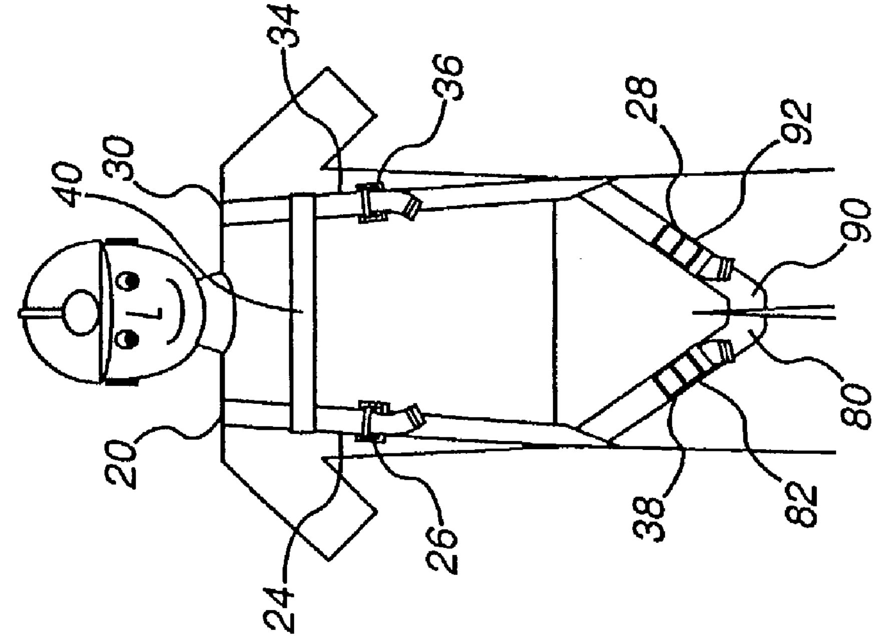
FIG. 2 illustrates a front view of a person wearing the safety harness of FIG. 1.

A second end of each of shoulder straps 20 and 30 extends downward over the front of the user as illustrated in FIG. 2 to form generally longitudinal first and second front straps 24 and 34, respectively. A first chest strap portion 42 is preferably attached to front strap 24 and a second chest strap portion 44 is attached to front strap 34. Each of first and second chest straps 42 and 44 have cooperating fastening members 46 and 48 on the ends thereof to enable attachment of first and second chest straps 42 and 44 to form chest strap 40. As known in the art, first and second chest straps are preferably attached via an adjustable mating buckle mechanism comprising cooperating fastening members 46 and 48.

First and second front straps 24 and 34 extend further downward and preferably include adjustment members 26 and 36 (for example, adjustable buckles) as known in the art for adjustment of the fit of safety harness 10 on the upper torso of the user. Extending still further downward as illustrated in FIG. 1, first and second front straps 24 and 34 converge and meet generally centrally to form a seat portion or subpelvic portion 70. As illustrated in FIGS. 2 and 3, first and second front straps 24 and 34 pass to the rear of the user and seat portion 70 passes under the seat of the user.

Attached to and extending from seat portion 70 are a first and a second leg strap 80 and 90, respectively. Each of first and second leg straps 80 and 90 pass around the upper leg of the user to be attached to the distal end of first and second longitudinal back straps 22 and 32, respectively. The distal ends of each of first and second leg straps 80 and 90 and the distal ends of each of longitudinal back straps 22 and 32 thus preferably comprise cooperating fastening members (82 and 92 and 28 and 38, respectively) such as adjusting buckle members as known in the art.

Shoulder straps 20 and 30 (including, longitudinal back straps 22 and 32 and first and second front straps 24 and 34) and first and second leg straps 80 and 90 are preferably adapted to have an elastic extension in the range of approximately 3% to approximately 15% at a tensile load of approximately 10 pounds. More preferably, such straps are adapted to have an elastic extension in the range of approximately 7% to approximately 11% under a tensile load of approximately 10 pounds. Nonetheless, these strap portions preferably exhibit a minimum ultimate tensile load of at least approximately 5,000 pounds.

In the design of FIG. 1, the bottom portion of safety harness 10 is fabricated from a single, integral length of elastic material. In that regard, the length of elastic material as described above begins at first end 94*a* on leg strap 90. The material then travels downward through fastening member 92 and then travels upward toward seat portion 70, thereby forming leg strap 90. Upon reaching seat portion 70, the material travels along the path identified by the left side of seat portion 70, forming the back side thereof. The material travels to adjustment member 36 at which point it is preferably looped around or through adjustment member 36. The material then travels downward (doubling itself) over the lower portion of longitudinal front strap 34 and the left side of seat portion 70. The material the travels across the center of seat portion 70 and upward along the path defined by the right side of seat portion 70. Upon reaching adjustment member 26, the material is preferably looped around or through adjustment member 26. After looping through adjustment member 26, the material travels downward (doubling itself) under the lower portion of longitudinal front strap 24 and the right side of seat portion 70. Before reaching the center of seat portion 70, the material breaks away from the path of seat portion 70 to extend downward to form leg strap 80. The material preferably loops through fastening member 82 and terminates at second end 94*b*. Over those areas of doubling, the material is preferably held together via, for example, several stitching areas (96*a*–96*j*).

As clear to one skilled in the art, the range of elastic extension of different portions of safety harnesses under the present invention can be chosen to be different to provide a sufficient range of motion and sufficient comfort while maintaining adequate safety. In the design of FIG. 1, for example, chest strap 40 and generally longitudinal back strap 60 may be fabricated from a relatively non-elastic material such as polyester and/or nylon. It is not essential to the ease of movement of the user of safety harness 10 to fabricate these portions from elastic material. Moreover, fabrication of these portions to be non-elastic may provide additional safeguards in preventing the user from undesirable coming out of a harness when, for example, shoulder straps 20 and 30 are adapted to have an elastic extension in the upper range specified herein.

To provide the unique combination of elastic and tensile load characteristics of the strap portions of the present safety harnesses, a composite material comprising at least one elastic material and at least one relatively non-elastic, high-strength material is preferably used. The entire strap portion can be fabricated from such a composite material or just a portion or section of the strap portion can be fabricated from such a composite material. For example, a section of such an elastic material may be sewn into a strap portion otherwise fabricated from conventional, non-elastic materials such as nylon and/or polyester. If a portion of an elastic material is sewn into a strap portion, the stitching must be suitable to satisfy the ultimate tensile load criteria set forth above for the strap portions of the present invention.

In one embodiment, the elastic portions or sections of the safety harness of the present invention (that is, those portions or sections having an elastic extension of at least approximately 3%) preferably comprise at least a section of a composite material such as a woven webbing material comprising a weave of one or more relatively non-elastic and strong materials (that is, having a high ultimate tensile load) with one or more materials having a lower ultimate tensile load, but greater elasticity. For example, in one embodiment of the present invention 2434 webbing, available from Murdoch Webbing Company, Inc. of Central Falls, R.I., and having a width of $1\frac{3}{4}$ inches was used. In one embodiment, the weave (a double plain weave) comprised approximately 71% nylon, approximately 16% polyester and 13% approximately spandex (71/16/13). Another 2434 webbing material from Murdoch Webbing Company, Inc. comprised a 62/23/15 weave. A 2436 webbing material from Murdoch Webbing Company, Inc. comprised a 78/9/13 weave.

Such composite materials had a minimum ultimate tensile load suitable for use in a full body safety harness (approximately 6000 lbs.) while exhibiting the most preferred approximately 7 to 11% range of elastic extension under tensile loads of approximately 10 to 20 pounds. In this embodiment, substantial elasticity over the desired range is provided by the elastomeric spandex yarn, but extension beyond the desired range of elastic extension is prevented by high tensile strength and relatively non-elastic yarns such as nylon and/or polyester yarns.

Figure 4A:
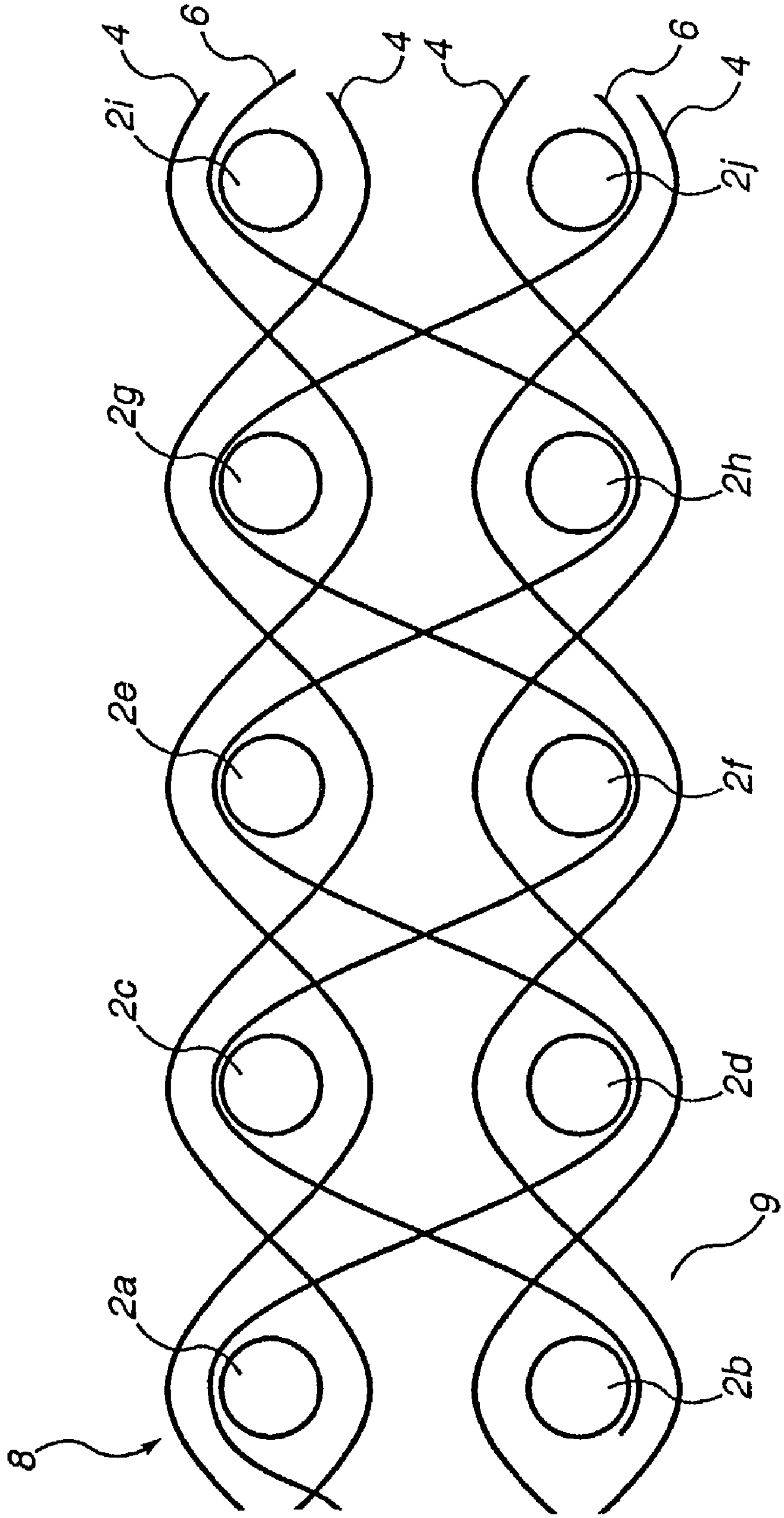
FIG. 4A illustrates a cross-sectional view of a common double plain weave suitable for use in woven webbing used in the present invention.

FIG. 4A illustrates in cross section an example of a composite double plain weave with 2 up 2 down binders as used in the 2434 and 2436 webbings of Murdoch Webbing Company, Inc. In this illustration 2*a*–2*j* represent filling yarn or picks that traverse the width of the webbing. Warp yarns or ground yarns 4 weave around filling yarns 2*a*–2*j* in a longitudinal direction. Binder yarns 6 weaves from the top or face 8 of the webbing to the bottom or back 9 of the webbing. Binder yarns 6 locks face 8 and back 9 together. In currently available webbing materials used in safety harnesses, ground yarns 4 and binder yarns 6 are nylon and/or polyester continuous filament yarns. In the webbing used in the strap portions of the present invention, however, binder yarns 6 are elastic yarns such as spandex. Such elastic yarns still hold face 8 and back 9 together, but allow for stretch or elastic extension in the webbing. The amount of stretch is controlled by the number of filling yarns or picks 2*a*–2*j* that are inserted per unit length (for example, per inch). The more picks provided per inch, the less is the elastic extension. The fewer picks provided per inch, the greater the elastic extension. The ultimate tensile load and the upper limit of the elastic extension is governed by ground yarns 4 which are preferably chosen to be non-elastic, high-strength filament yarns such as nylon or polyester.

A comparison of the extension of elastic webbing suitable for use in the present invention (as illustrated in FIG. 4A) and two standard nylon webbing materials (available from Southwest Weaving of Greenville, S.C.) is set forth in Tables 1 and 2 below for various tensile loads. In the experiments set forth in Tables 1 and 2, the lengths of the material being tested were subjected to a given tensile load via a Tinius Olsen tensile gauge. Before extension two points separated by 12 inches were marked on each sample. At each tensile load indicated, the distance between the two points was measured and the percent extension calculated as described above.

TABLE 1

| Tensile | 2434 Elastic Webbing | | 1010RN Webbing | | 998MN Webbing | |
|---|---|---|---|---|---|---|
| Load (lbs) | Distance (inches) | Percent Extension | Distance (inches) | Percent Extension | Distance (inches | Percent Extension |
| 0 | 12 | 0 | 12 | 0 | 12 | 0 |
| 20 | $12\frac{3}{4}$ | 6.25 | $12\frac{1}{16}$ | 0.53 | $12\frac{1}{8}$ | 1.04 |
| 40 | $12\frac{7}{8}$ | 7.29 | $12\frac{1}{8}$ | 1.04 | $12\frac{3}{16}$ | 1.56 |
| 60 | $12\frac{15}{16}$ | 7.81 | $12\frac{3}{16}$ | 1.56 | $12\frac{1}{4}$ | 2.08 |
| 80 | 13 | 8.33 | $12\frac{1}{4}$ | 2.08 | $12\frac{1}{4}$ | 2.08 |
| 100 | $13\frac{1}{16}$ | 8.85 | $12\frac{1}{4}$ | 2.08 | $12\frac{5}{16}$ | 2.6 |

TABLE 2

| Tensile | 2434 Elastic Webbing | | 1010RN Webbing | | 998MN Webbing | |
|---|---|---|---|---|---|---|
| Load (lbs) | Distance (inches) | Percent Extension | Distance (inches) | Percent Extension | Distance (inches | Percent Extension |
| 500 | $13\frac{3}{4}$ | 14.58 | $12\frac{3}{8}$ | 3.12 | $12\frac{7}{8}$ | 7.29 |
| 1000 | $14\frac{1}{2}$ | 18.66 | $12\frac{3}{4}$ | 6.25 | $13\frac{1}{2}$ | 12.5 |
| 1500 | 15 | 25 | $13\frac{1}{8}$ | 9.38 | $13\frac{5}{8}$ | 13.5 |
| 2000 | $15\frac{1}{4}$ | 27.08 | $13\frac{3}{8}$ | 11.46 | 14 | 16.67 |
| 2500 | $15\frac{1}{2}$ | 29.17 | $13\frac{1}{2}$ | 12.5 | $14\frac{1}{8}$ | 17.7 |
| 3000 | $15\frac{3}{4}$ | 31.25 | $13\frac{3}{4}$ | 14.58 | $14\frac{1}{4}$ | 18.7 |
| 3500 | 16 | 33.33 | $13\frac{7}{8}$ | 15.65 | $14\frac{3}{8}$ | 19.7 |
| 4000 | $16\frac{1}{16}$ | 33.85 | 14 | 16.67 | $14\frac{1}{2}$ | 20.8 |

The ease with which the elastic webbing of the present invention can be extended is further demonstrated in the data of Table 3 below. In the experiments set forth in Table 3, a 100 inch length of material was attached to a 50 pound tensile gauge. The sample was extended to the percent extensions indicated in Table 3 and the corresponding forces were recorded.

TABLE 3

| Percent Extension | Force (pounds) |
|---|---|
| 1 | 2.9 |
| 2 | 3.6 |
| 3 | 4.1 |
| 4 | 4.7 |
| 5 | 5.1 |
| 6 | 5.7 |
| 7 | 6.6 |
| 8 | 7.6 |

TABLE 3-continued

| Percent Extension | Force (pounds) |
|---|---|
| 9 | 9.4 |
| 10 | 14.9 |

Figure 4B:
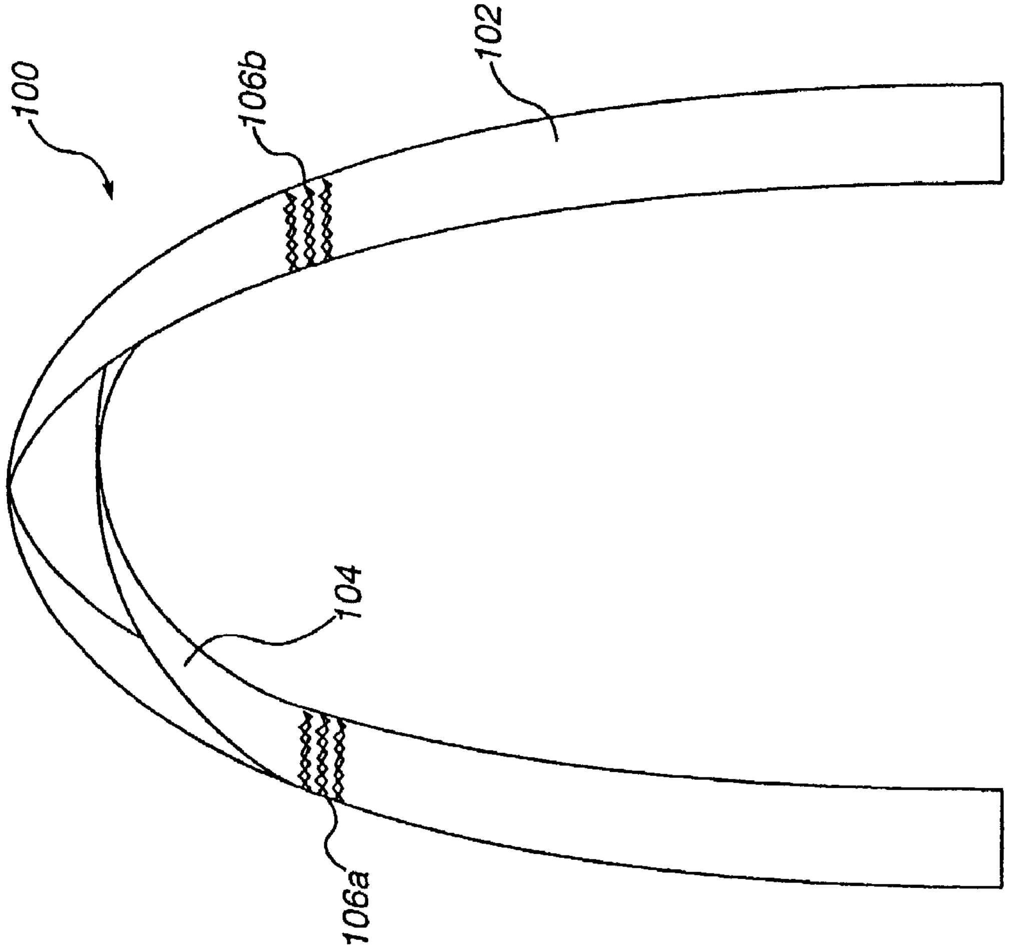
FIG. 4B illustrates a composite strap portion suitable for use in the present invention.

FIG. 4B illustrates another embodiment of a composite strap portion 100 for use in the present invention. Strap portion 100 comprises a non-elastic, high-strength strap 102 (for example, standard nylon and/or polyester strap webbing) and an elastic strap 104 (which may have a low tensile strength) attached to the interior of strap 102 via stitching areas 106*a* and 106*b*. Using the example of a shoulder strap portion, strap portion 100 is slung over the shoulder of the user such that elastic strap 104 preferably forms a snug fit with the shoulder and high-strength strap allows elastic extension or "play" in the range of 3 to 20% in strap 102 as described above. The user can thereby move relatively easily. High-strength strap portion 102 (which may be a standard nylon/polyester webbing material), however, limits the elastic extension of strap portion 102 to approximately 20% and provides the tensile strength required in fall arresting situations. In certain situations in which there is a danger of catching a loose hanging harness strap on various objects, the elastic webbing of FIG. 4A may be preferable to the embodiment of FIG. 4B as the embodiment of FIG. 4B requires high-strength strap 102 to be somewhat loose fitting.

Buckles used in safety harnesses of the present invention may be fabricated from forged steel having a minimum ultimate tensile load of approximately 4,000 lbs. Such buckles are preferably cad or zinc plated and meet the ASTM fifty-hour salt spray test requirements. D-rings for use in safety harnesses of the present invention are preferably steel rings with a minimum tensile strength of approximately 5000 lbs. Such D-rings are preferably cad or zinc plated and meet the ASTM fifty-hour salt spray test requirements. Stitching is preferably performed with a nylon thread such as VT-295E, Type II, Class A sizes 415 and F. Sewing is preferably performed with four to six stitches per inch with size 415 thread and with six to eight stitches per inch with size F thread. All stitching ends are preferably backstitched a minimum of two stitches.

Figure 5:
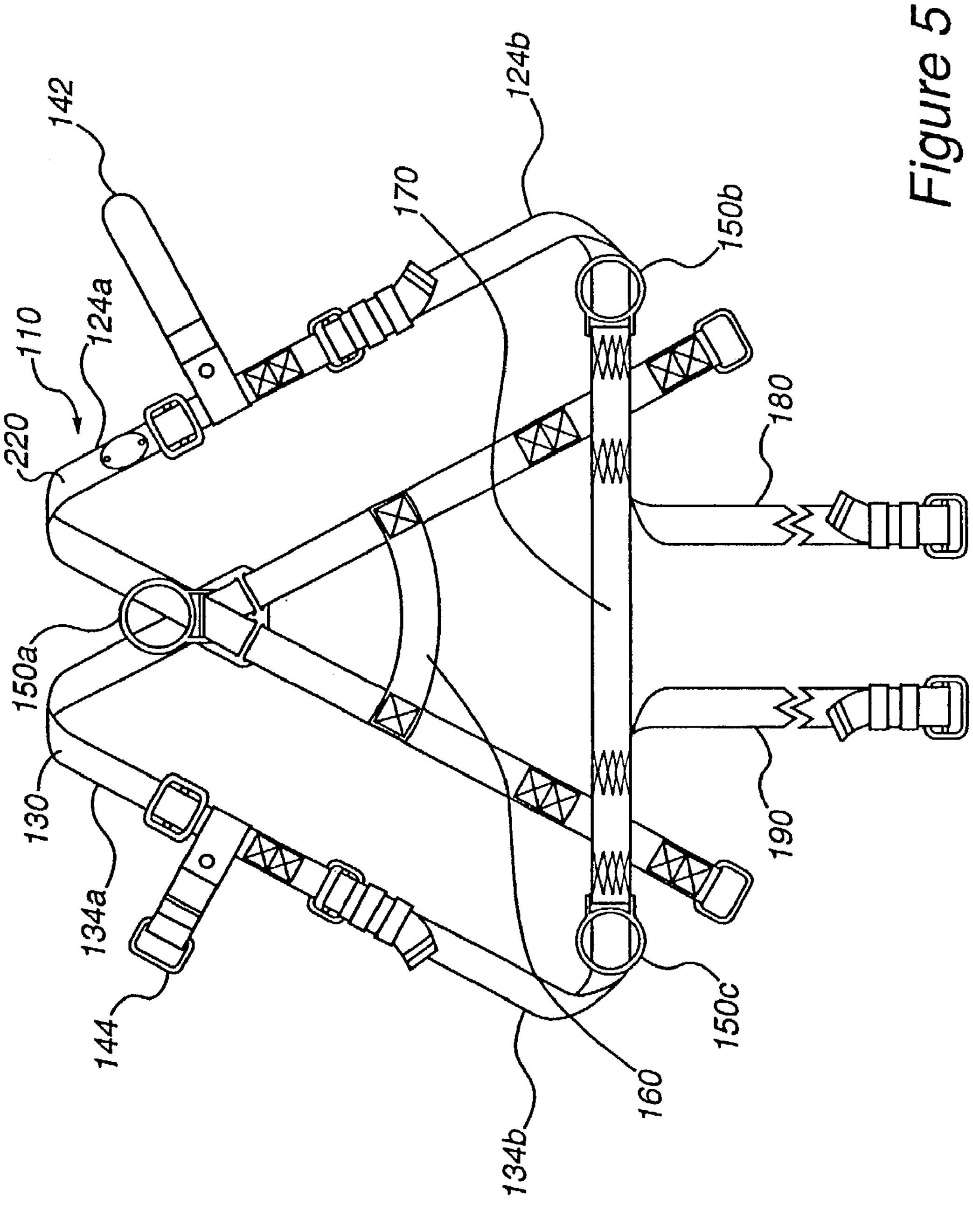
FIG. 5 illustrates a rear view of another embodiment of a full-body safety harness under the present invention.
Figure 6:
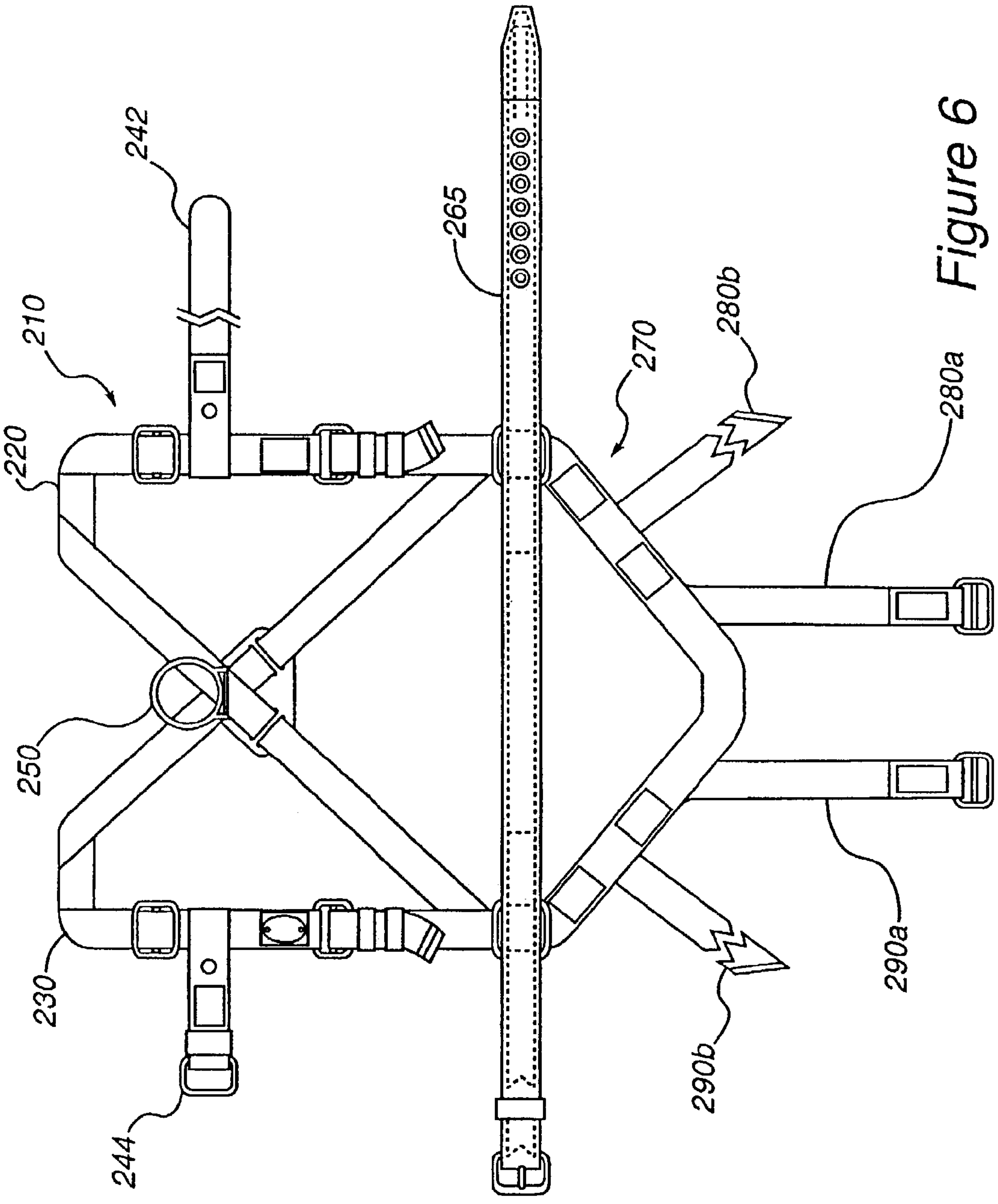
FIG. 6 illustrates a rear view of a further embodiment of a full-body safety harness under the present invention.

Full-body harnesses under the present invention generally meet or exceed the requirements of all relative OSHA, CSA (Canadian Standards Association) and ANSI standards. Moreover, the benefits received from the incorporation of the elastic materials of the present invention into safety harnesses are not limited to certain safety harness designs. Virtually any known safety harness can be retrofitted or any new safety harness be designed to incorporate such elastic materials. FIGS. 5 and 6, for example, set forth two alternatives to the safety harness design discussed in connection with FIGS. 1 through 3.

FIG. 5 illustrates a full-body safety harness similar in design to that illustrated in FIG. 1. Safety harness 110 is similar in overall structural design to Miller Equipment Model 850. Safety harness 110 of FIG. 5, however, includes a non-elastic seat of butt strap portion 170. Shoulder straps 120 and 130, including the upper longitudinal front strap portions 124*a* and 134*a* are preferably fabricated from elastic webbing as described above. First and second chest strap portions 142 and 144 are preferably fabricated from non-elastic materials such as nylon and/or polyester. Lower front strap portions 124*b* and 134*b* are preferably fabricated from elastic webbing. Non elastic seat strap portion 170 is preferably attached to lower front strap portions 124*b* and 134*b* via stitching. Safety harness 110 preferably includes a back D-ring 150*a* and a non-elastic back strap 160. Safety harness 110 also includes additional D-ring 150*b* and 150*c* for positional adjustment as known in the art. Safety harness 110 further comprises leg straps 180 and 190.

FIG. 6 illustrates a safety harness 210 comprising a grommetted non-elastic belt strap 265. Safety harness 210 is similar in overall structural design to Miller Equipment Model 8095. Non-elastic belt strap 265 is attached to the lower portion of shoulder straps 220 and 230. Shoulder straps 220 and 230 are preferably fabricated from elastic webbing as described above. As in the designs discussed above, safety harness 210 preferably comprises first and second chest strap portions 242 and 244 fabricated from non-elastic webbing. Safety harness 210 also comprises a seat strap portion 270 attached to the lower portions of shoulder strap portions 220 and 230. Seat strap portion 270 is preferably fabricated from elastic webbing. Attached to seat strap portion 270 are leg strap portions 280*a*, 280*b*, 290*a* and 290*b*, which are preferably fabricated from elastic webbing as described above. Safety harness 210 is anchored via D-ring 250.

Although the present invention has been described in detail in connection with the above examples, it is to be understood that such detail is solely for that purpose and that variations can be made by those skilled in the art without departing from the spirit of the invention except as it may be limited by the following claims.

What is claimed is:

1. A safety harness to be worn by a person to protect the person at a height, comprising at least one shoulder strap to extend over the shoulder of the person at least a section of the shoulder strap of the safety harness comprising a strap having a profile of a single strap and having elastic extension to enable movement of a person in the safety harness via elastic extension of the strap under a load of 10 to 20 pounds, the elastic extension of the strap being limited to prevent separation of a person from the safety harness.

2. The safety harness of claim 1 wherein the strap is a composite strap including at least a first material having a high ultimate tensile load and at least a second material, the second material being elastic and having an ultimate tensile load lower than the first material.

3. The safety harness of claim 2 wherein the first material is woven with the second material to form the strap.

* * * * *